Sept. 2, 1969  G. W. ROACH  3,464,298
COTTON BALE SAMPLING MACHINE
Filed Jan. 6, 1967  4 Sheets-Sheet 1

Fig. I

Gay W. Roach
INVENTOR.

BY Clarence A. O'Brien
and Harvey B. Jacobson
Attorneys

Gay W. Roach
INVENTOR.

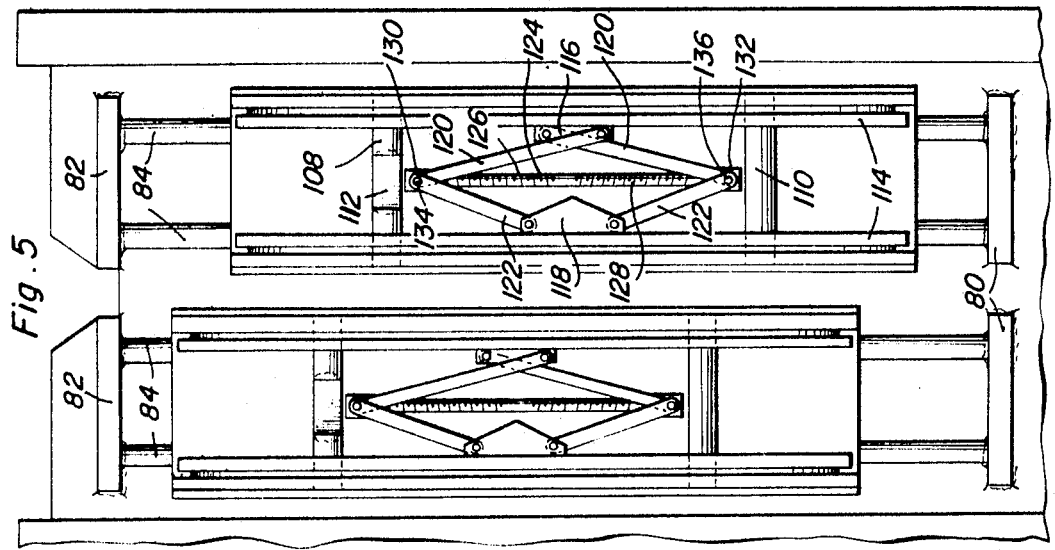
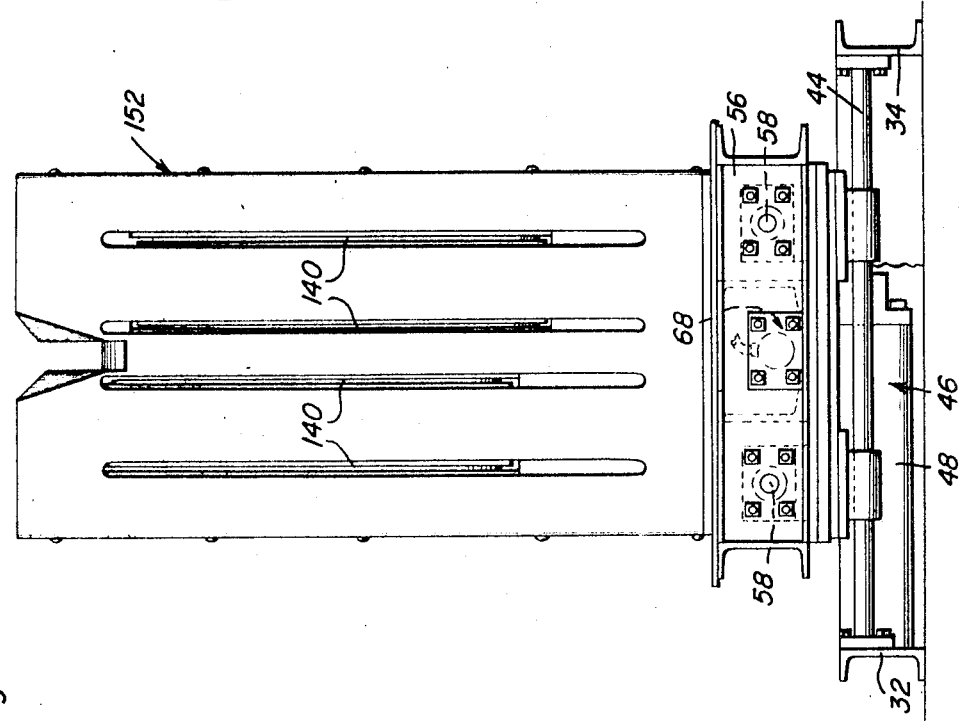

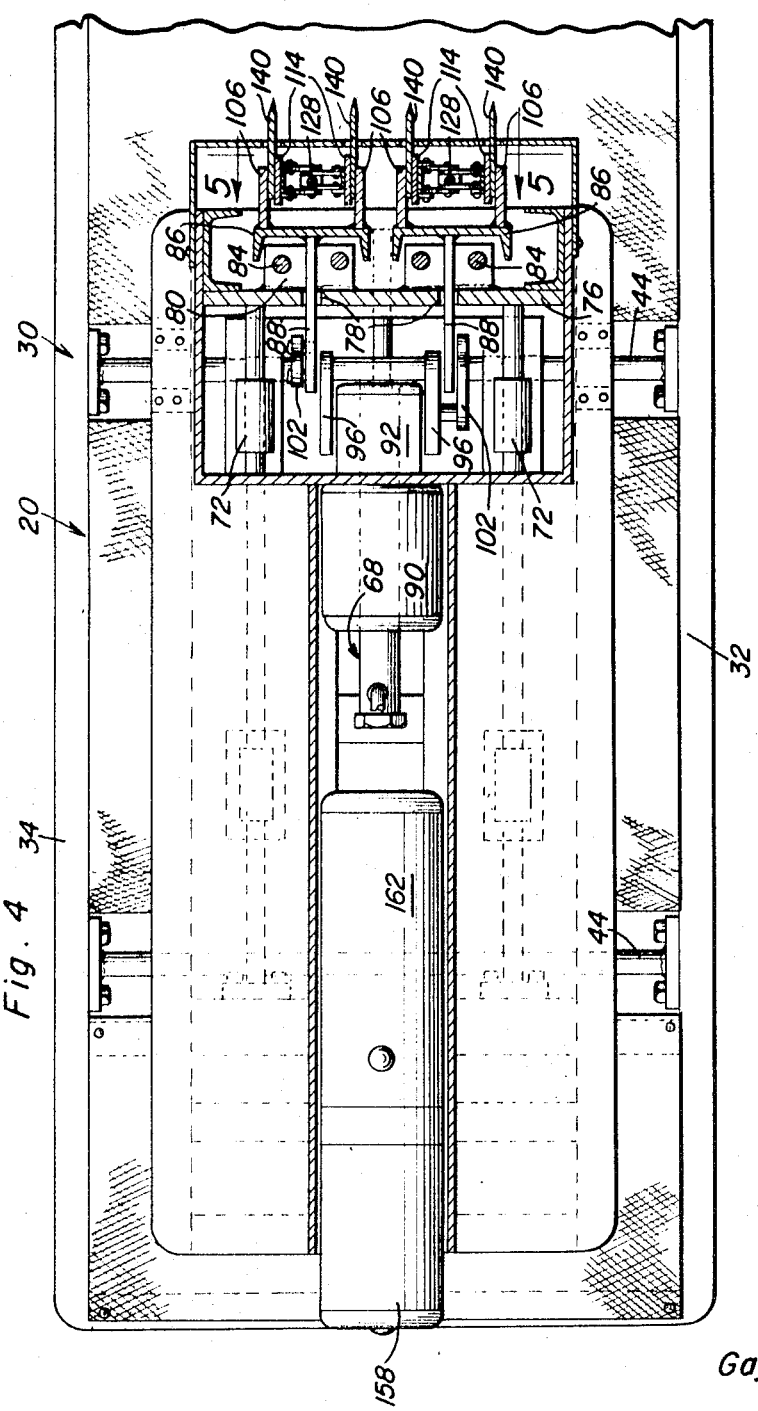

United States Patent Office 3,464,298
Patented Sept. 2, 1969

1

3,464,298
COTTON BALE SAMPLING MACHINE
Gay W. Roach, P.O. Box 128, Trumann, Ark. 72472
Filed Jan. 6, 1967, Ser. No. 607,762
Int. Cl. B26d 5/08
U.S. Cl. 83—1
9 Claims

ABSTRACT OF THE DISCLOSURE

A machine operative to selectively make parallel cuts in one or both sides of a bale of cotton between adjacent baling straps extending about the bale whereby the portions of the bale disposed between each pair of parallel cuts may be pulled from the bale and retained as a sample of the cotton within the bale.

---

This invention relates to a machine capable of forming one or more pairs of parallel cuts in one or opposite sides of a cotton bale whereby portions of the bale disposed between each pair of parallel cuts may be removed and retained as samples of the cotton in each bale. Further, the machine of the instant invention has been perfected to the extent that it may be operated by a single operator to cut samples from two to three hundred cotton bales per hour. In addition, the machine of the instant invention includes cutting blades that are supported in a manner whereby they may be quickly changed for sharpening inasmuch as such blades must be changed or sharpened after sampling five to six hundred bales or approximately once every two hours of operation.

The machine of the instant invention is specifically designed to cut a cotton bale in a manner such that at least two samples of the bale may be taken inasmuch as in most cases one sample is taken for the government and a second sample is taken for the cotton gin operator or the owner of the bale.

The main object of this invention is to provide a machine operative to cut at least two samples from a bale of cotton and in a manner such that the machine may have cotton bales from which samples are to be taken fed thereto by means of a conveyor assembly.

Another object of this invention is to provide a machine in accordance with the preceding objects and which will be capable of large volume production, being able to cut samples from two to three hundred cotton bales per hour or four to five bales per minute.

Yet another object of this invention is to provide a machine in accordance with the preceding objects requiring only one operator.

Still another object of this invention is to provide a machine of the type set forth above and which will be operable to cut one or more samples from opposite sides of a cotton bale.

A further object of this invention is to provide a cotton bale sampling machine including cutting blades supported from the machine in a manner such that they may be readily removed or replaced for sharpening.

A final object of this invention to be specifically enumerated herein is to provide a cotton bale sampling machine in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a front elevational view of the assemblage illustrated in FIGURE 2 as seen from the right side thereof;

FIGURE 4 is a horizontal sectional view taken substantially upon the plane indicated by the section line 4—4 of FIGURE 2; and FIGURE 5 is an enlarged fragmentary vertical sectional view taken substantially upon the plane indicated by the section line 5—5 of FIGURE 4.

Figure 1:
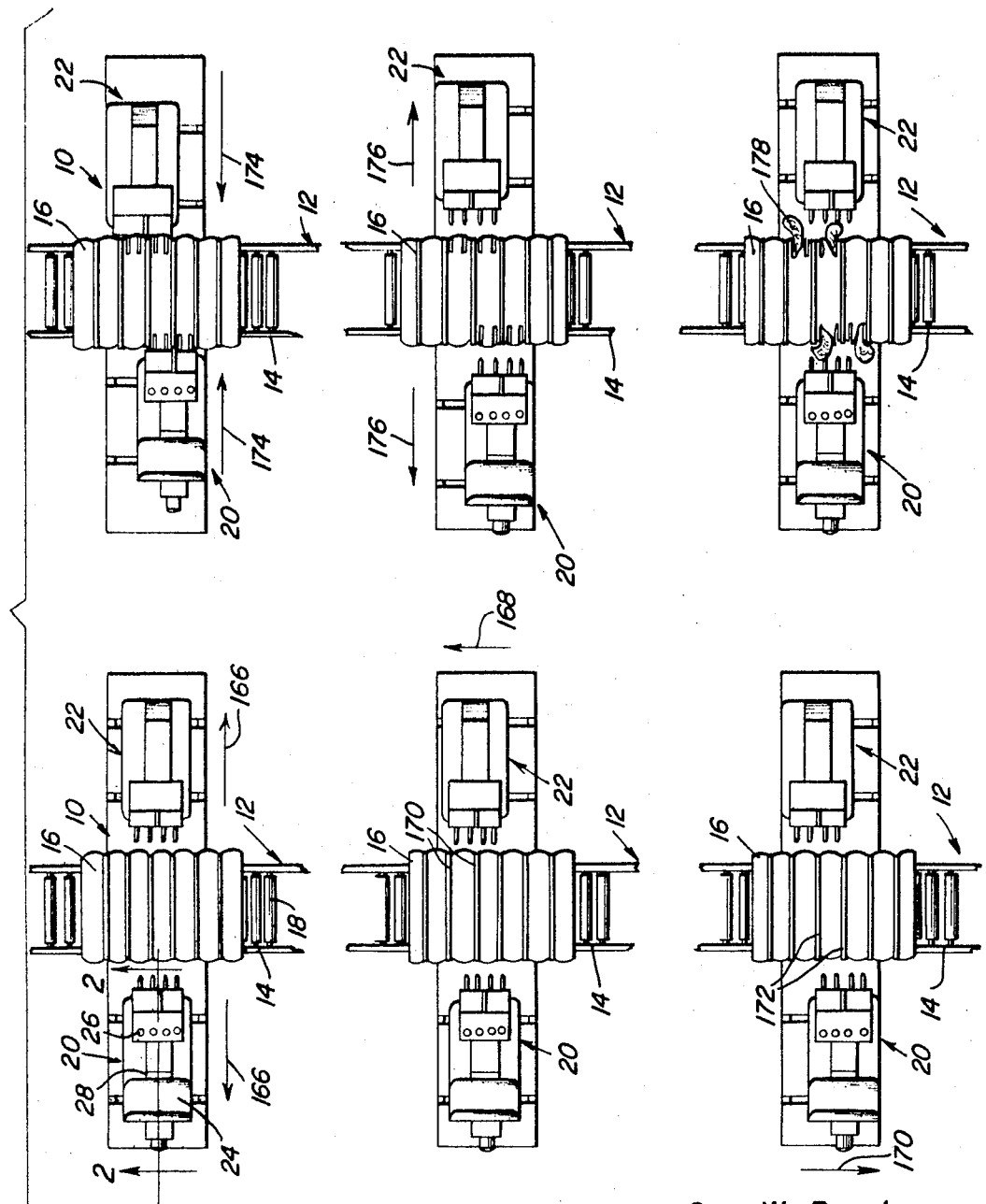
FIGURE 1 is a grouping of six schematic top plan views of the machine illustrating sequential operating steps of the machine.

Referring now more specifically to the drawings the numeral 10 generally designates the cotton bale sampling machine of the instant invention. The machine 10 is adapted to be positioned in operative association with a conveyor assembly generally referred to by the reference numeral 12 and including a section 14 thereof whose operation may be automatically or manually controlled for moving the cotton bale 16 longitudinally thereof.

The section 14 of the conveyor assembly 12 is only schematically illustrated in FIGURE 1 as including transverse support rollers 18. However, the section 14 also includes an endless conveyor member (not shown) entrained about the rollers 18 at the opposite ends of the section 14, at least one of the opposite end rollers being selectively driven by motor means controlled from the machine 10 or another location either manually or automatically.

The machine 10 includes a pair of opposite side sections generally referred to by the reference numerals 20 and 22, these sections being similar in construction except that the section 20 is provided with an operator's seat 24 and suitable hand operable controls 26 and 28 for operating the various motors of the sections 20 and 22. Accordingly, only the structural details of the section 20 are illustrated in detail in the drawings and will be specifically described hereinafter.

The machine 10 includes a base frame referred to in general by the reference numeral 30 consisting of a pair of elongated opposite side longitudinal members 32 and 34 interconnected by means of numerous transverse members 36 spaced longitudinally of the base frame 30.

The section 20 includes an intermediate carriage structure generally referred to by the reference numeral 38 and which includes transverse members 40 from which pairs of depending and axially aligned sleeves 42 are supported. A pair of guide rods 44 are secured between the longitudinal members 32 and 34 beneath the carriage or intermediate structure 38 in parallel relation and the pairs of sleeves 42 carried by the transverse members 40 are slidingly disposed on the guide rods 44 whereby the structure 38 may be shifted longitudinally of the rods 44 and laterally of the base frame 30.

A double-acting extendible fluid motor referred to in general by the reference numeral 46 has the base end of its cylinder portion 48 secured to the longitudinal member 32, see FIGURE 3, and the free end of its piston rod portion 50 is secured to the lower end portion of a depending flange 52 carried by the structure 38. Therefore, actuation of the fluid motor 46 may be utilized to shift the structure 38 longitudinally of the rods 44.

The structure 38 additionally includes transverse members 54 and 56 between which a pair of generally parallel guide rods 58 are secured. A support frame generally referred to by the reference numeral 60 and comprising a part of the section 20 includes transverse members 62 and 64 from which the cylinder portion 66 of a double-acting extendible fluid motor 68 is supported, the piston rod portion 70 of the fluid motor 68 having its free end removably secured to the transverse member 56. Further, the support frame 60 additionally includes laterally spaced pairs of axially aligned sleeves 72 slidably disposed on the guide rods 58. Therefore it may be seen that the support frame 60 may be shifted longitudinally of the guide rods 58 upon actuation of the fluid motor 68, the structure 38 being shiftable longitudinally of the rods 44 upon actuation of the fluid motor 46.

Figure 2:
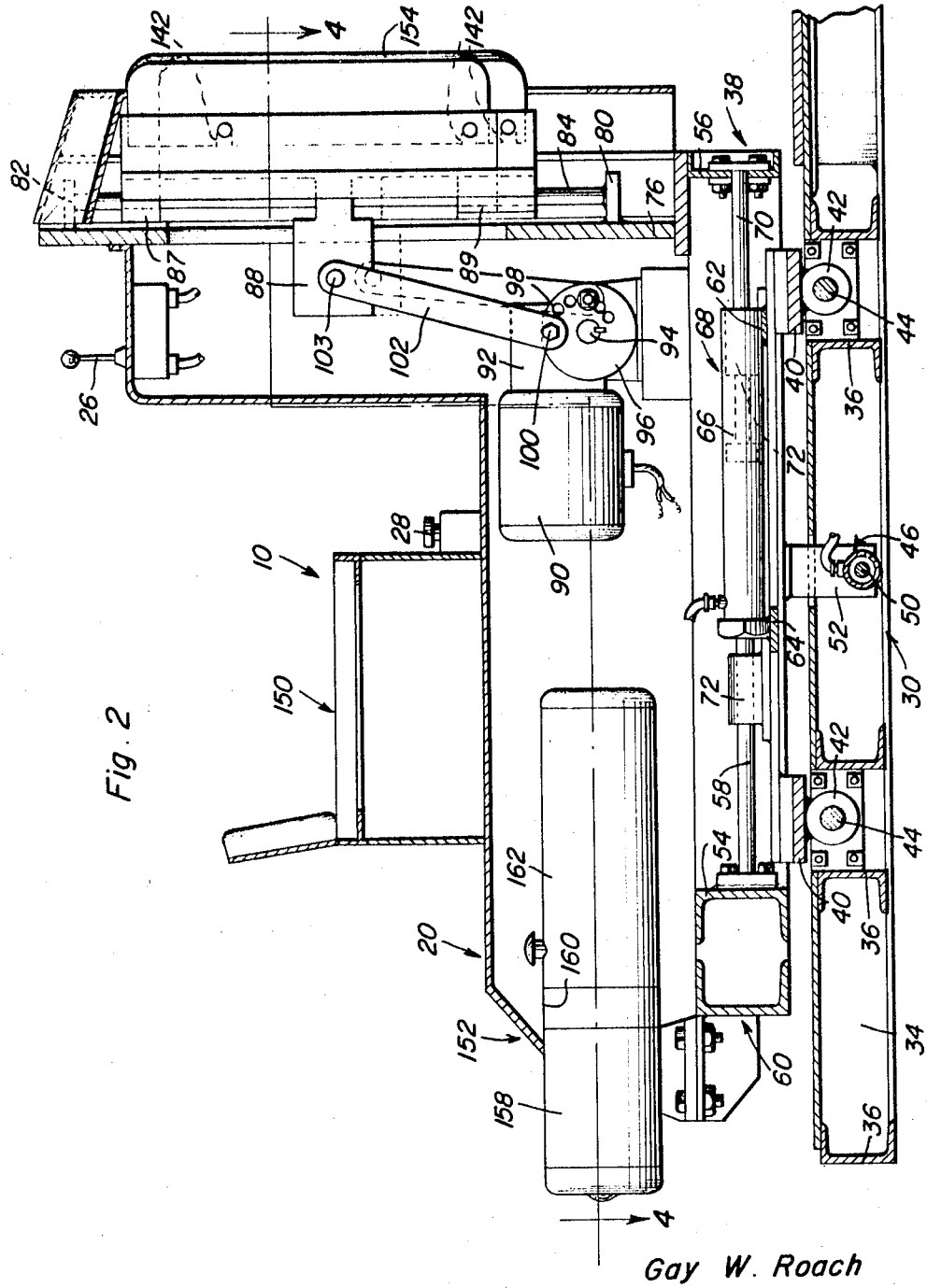
FIGURE 2 is a fragmentary enlarged vertical sectional view taken substantially upon the plane indicated by the section line 2—2 of FIGURE 1.

The support 20 includes an upstanding partition 76 including a pair of vertical slots 78, see FIGURE 4. The partition 76 includes two pairs of vertically spaced laterally outwardly projecting support flanges 80 and 82, FIGURE 2, between which corresponding pairs of substantially vertically disposed guide rods 84 are secured. Further, a pair of vertically disposed and reciprocal channel members 86 are provided and disposed immediately outwardly of the corresponding pairs of guide rods 84 on the sides thereof remote from the partition 76. The channel members 86 open toward and partially embracingly receive the guide rods 84 therein and each includes a horizontally directed arm portion 88 which projects through the corresponding slot 78. Further, each of the channel members 86 includes upper and lower sleeve follower means 87 and 89 slidably engaged with the corresponding pair of guide rods 84. The channel members 86 are driven from an electric motor 90 supported from the frame 60. The motor 90 drives a gear reduction assembly 92 including an output shaft 94 whose opposite ends project outwardly from opposite sides of the gear reduction assembly 92. The opposite ends of the shaft 94 have a pair of crank disks 96 mounted thereon for rotation therewith and each of the crank disks 96 is provided with a plurality of crankpin bores 98 spaced different distances from the center of the shaft 94 and circumferentially about the corresponding disk 96. A removable crankpin defining pivot fastener 100 is secured through a selected one of the bores 98 in each disk 96 and pivotally secures one end of a corresponding connecting rod 102 to the disk 96. The ends of the connecting rods 102 remote from the disks 96 are pivotally connected to the horizontally disposed and laterally projecting arms 88 carried by the channel members 86 as at 103. Therefore, the channel members 86 are vertically reciprocated along the guide rods 84 in response to operation of the motor 90.

Each of the channel members 86 includes a pair of spaced apart plates 106 defining confronting abutment surfaces and each pair of plates 106 has a pair of vertically spaced rods 108 and 110 secured therebetween, the rods 108 each having a centrally disposed and vertically extending opening 112 formed therethrough. A pair of plate-like pressure members 114 are disposed between each pair of plates 106 adjacent the latter and are slidably mounted on the corresponding rods 108 and 110 by means of openings (not shown) formed through the pressure members 114 through which the rods 108 and 110 are slidably received. The pressure members 114 carried by each channel member 86 include suitable mounting brackets 116 and 118 to which corresponding ends of two pairs of links 120 and 122, respectively, are pivotally secured. A screw shaft 124 provided with oppositely threaded upper and lower end portions 126 and 128 has a pair of upper and lower internally threaded sleeves 130 and 132 threadedly engaged on its upper and lower end portions. The upper ends of each pair of upper links 120 and 122 are pivotally secured to opposite sides of the corresponding sleeve 130 as at 134 and the lower ends of each pair of lower links 120 and 122 are pivotally secured to opposite sides of the corresponding lower sleeve 132 as at 136. The upper end of each screw shaft 124 may be provided with a non-circular projection or recess (not shown) adapted to have an elongated tool engaged therewith through the corresponding opening 112 whereby the screw shaft 124 may be selectively rotated to shift the sleeves 130 and 132 toward and away from each other causing the pressure members 114 to shift toward and away from the corresponding plate members 106.

The machine 10 includes a pair of generally panel-like blade members 140 supported from each channel member 86 between the confronting surfaces of the remote sides of the corresponding pressure members 114 and the associated plate members 106. The panel-like blade members 140 include notches 142 in which the corresponding rods 108 and 110 are received for vertically locating the panel-like blade members 140 relative to the corresponding plate members 106. Of course, after the panel-like blade members 140 have been positioned to receive the corresponding rods 108 and 110 in the recesses 142, the screw shafts 124 may be actuated to urge the pressure members 114 toward the confronting plate-like members 106 and thus clampingly support each of the panel-like blade members 140 from the corresponding channel member 86.

The section 20 includes an operator's seat construction generally referred to by the reference numeral 150 supported from the frame 60 and a suitable housing generally referred to by the reference numeral 152 which at least substantially encloses all of the working components of the section 20 supported from the frame 60 with the exception of the cutting edge portions 154 of the blade members 140. The seat construction is of course supported from the housing 152 as are the hand operable controls 26 and 28, the controls 26 being provided for controlling operation of the hydraulic cylinders of fluid motors 46 and 68 of each section 20 and 22 and the controls 28 being operable to control the operation of the motor 90 carried by each section 20 and 22 as well as the electric motor 158 carried by the section 20. The electric motor 158 is drivingly coupled to a fluid pump 160 operatively associated with an accumulator tank 162, it being understood that the pump outlet is operatively communicated with both ends of each fluid motor 46 and 68 through the controls 26 and that the tank 162 is in communication with both ends of each fluid motor 46 and 68 through the controls 26.

With reference now more specifically to FIGURE 1, it will be noted that the upper left hand portion of the figure illustrates by the arrows 166 that the sections 20 and 22 may initially be moved apart by means of the fluid motors 68 so as to be adapted to receive the cotton bale 16 therebetween moved along the section 14 of the conveyor assembly 12. When the bale 16 has been properly positioned as illustrated in FIGURE 1 between the sections 20 and 22, the section 14 of the conveyor assembly 12 may be stopped and the section 22 may then be laterally shifted in the manner indicated by the arrow 168 in the center left hand showing of FIGURE 1 so that each pair of blade members 140 is positioned between adjacent bands 170 extending about the blade 16. Thereafter, as illustrated in the lower left hand portion of FIGURE 1, the section 20 may be laterally adjusted by means of its fluid motor 46 as indicated by the arrow 170 so that each pair of its blade members 140 are positioned between adjacent straps 172. Then, as illustrated in the upper right hand portion of FIGURE 1, the sections 20 and 22 may be moved toward each other in the direction of arrows 174 so as to engage the blade members 140 with the bale 16 by actuation of the fluid motors 68 of the sections 20 and 22. During movement of the sections 20 and 22 toward each other so as to engage the blade members 140 with the cotton bale 16, the motor 90 is actuated so as to cause the blade members 140 to be vertically reciprocated and thus cut into the bale 16 as they are forced into the latter. Thereafter, as illustrated in the center right hand portion of FIGURE 1 by the arrows 176, the sections 20 and 22 may be shifted away from each other by actuation of the hydraulic cylinders 68 and the portions of the bale 16 disposed between each pair of adjacent cuts made in the bale 16 may be pulled therefrom as at 178 and retained as samples of the cotton of which the bale 16 is formed.

From the above description it may therefore be seen that both sections 20 and 22 may be readily positioned for proper engagement of the cutting blade members 140 carried thereby with the cotton bale 16 between adjacent bands 170 and that the bale 16 may be subsequently cut by the cutting blade members 140 in order that samples of the bale 16 may be readily withdrawn from opposite sides thereof.

Of course, after the bale 16 has had samples cut therefrom, the section 14 of the conveyor assembly 12 is again actuated to move the bale 16 toward a discharge point and to advance the next bale from which samples are to be cut to a position between the sections 20 and 22. The operator of the machine 10 may therefore quickly cut as many as four samples from opposite sides of a cotton bale. Further, it is envisioned that the drive means for the section 14 of the conveyor assembly 12 could be provided with control means operative to terminate operation of the section 14 automatically upon the positioning of bale 16 between the sections 20 and 22 and that each movement of the sections 20 and 22 toward their greatest spaced apart positions could be operative to initiate actuation of the section 14 of the conveyor assembly 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cotton bale sample slicing machine adapted for high volume operation by a single operator, said machine comprising base means, support means including a first side adapted to extend along and oppose one side portion of a conveyor assembly adjacent to which said base means may be positioned, said support means being mounted on said base means for limiting shifting relative to said base means along a first generally horizontal path paralleling the direction in which said first side faces and a second horizontal path disposed at generally right angles relative to the first path, and upstanding bale cutting blade means vertically movable relative to and supported from said first side and facing in said direction operable to make upstanding cuts in the sides of bales disposed on said conveyor assembly.

2. The combination of claim 1 wherein said bale cutting blade means include panel-like blade members vertically reciprocally supported from said support means.

3. The combination of claim 2 wherein said blade members are arranged in pairs of blade members mounted for simultaneous shifting.

4. The combination of claim 1 wherein said machine includes base portions disposed on opposite sides of a path along which a plurality of said bales are adapted to be intermittently longitudinally advanced, said support means including a pair of support structures mounted on said base portions and shiftable relative thereto along said paths and including corresponding cutting blade means, corresponding paths of movement of said support structures generally paralleling each other.

5. The combination of claim 4 wherein said support structures are independently shiftable relative to the corresponding base portions.

6. The combination of claim 5 wherein said support structures are supported from said portions of said base means through corresponding intermediate members from which said support structures are each mounted for shifting along one of said paths, said intermediate members each being supported from the corresponding portion of said base means for shifting along the other of said paths, said machine including a plurality of motor means operative to shift said intermediate members relative to said base portions and said support structures relative to said intermediate members and to drive said cutting blade means, respectively, said plurality of motor means including controls therefor operable from a single location.

7. The combination of claim 6 wherein said single location comprises an operator's position on one of said support structures.

8. A cotton bale sample slicing machine adapted to cut samples from an elongated cotton bale of the type including binding members extending thereabout at points spaced longitudinally thereof and disposed horizontally on its side, said machine including base means adapted to be disposed alonside said bale, support means, means mounting said support means on said base means for limited shifting relative to said base means along generally horizontal paths disposed at generally right angles relative to each other, and bale cutting blade means carried by said support means and operable to make upstanding cuts in the adjacent side of said bale extending inwardly of the latter, said bale cutting blade means including elongated upstanding and longitudinally movable cutting edges facing in one direction along one of said paths, said bale cutting blade means including a blade carrier mounted on said support means for reciprocation along an upstanding path, said blade carrier defining a pair of horizontally spaced apart opposing abutment surfaces extending along said path and a pair of pressure members supported from said blade carrier between said abutment surfaces and for adjustable positioning toward and away from the latter, upstanding panel-like blade members disposed between each pressure member and the opposing abutment surface, and means operative to shift said pressure members toward said abutment surfaces and thereby removably clamp said blade members between said pressure members and the opposing abutment surfaces.

9. The combination of claim 8 wherein the last-mentioned means includes means connected between said pressure members and operative to force the latter apart and therefore toward said abutment surfaces.

References Cited

UNITED STATES PATENTS

| | | | |
|---|---|---|---|
| 2,866,504 | 12/1958 | Syers | 83—919 |
| 3,146,654 | 9/1964 | Mathews et al. | 83—640 |

ANDREW R. JUHASZ, Primary Examiner

JAMES F. COAN, Assistant Examiner

U.S. Cl. X.R.

83—620, 628, 640, 647; 146—70.1